July 24, 1934.  W. H. GEIGER  1,967,710

ELECTRICAL MEASURING INSTRUMENT

Filed Nov. 7, 1933

WITNESSES

INVENTOR.

Patented July 24, 1934

1,967,710

UNITED STATES PATENT OFFICE

1,967,710

ELECTRICAL MEASURING INSTRUMENT

Wesley H. Geiger, Wormleysburg, Pa.

Application November 7, 1933, Serial No. 696,952

15 Claims. (Cl. 171—95)

My invention relates to electrical measuring instruments, more especially to a combined alternating current volt and polarity meter.

One object of my invention is to combine with an alternating current voltmeter a secondary or testing circuit to be used in checking the polarity with the circuit of the voltmeter.

Another object of my invention is to make one instrument that can be used as a voltmeter and also as a polarity meter or in other words combining the two instruments in one, without deviating from the general construction of the varied types of meters.

Figure 1:
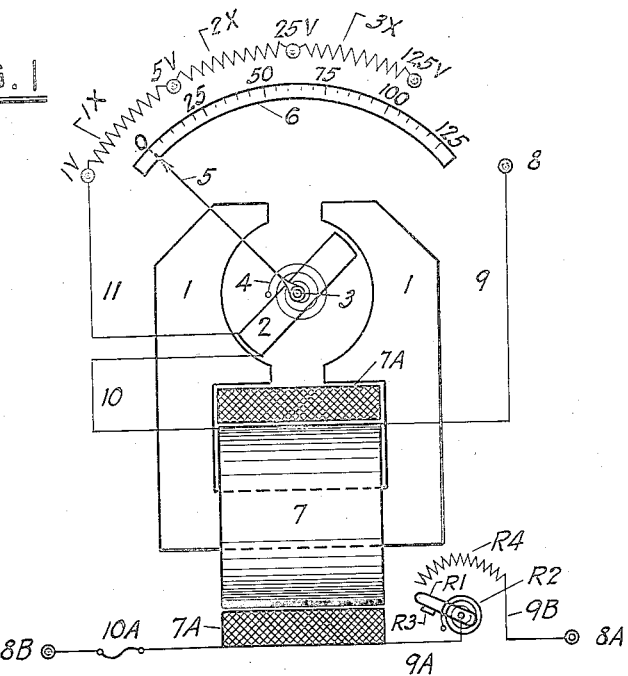
Figure 2:
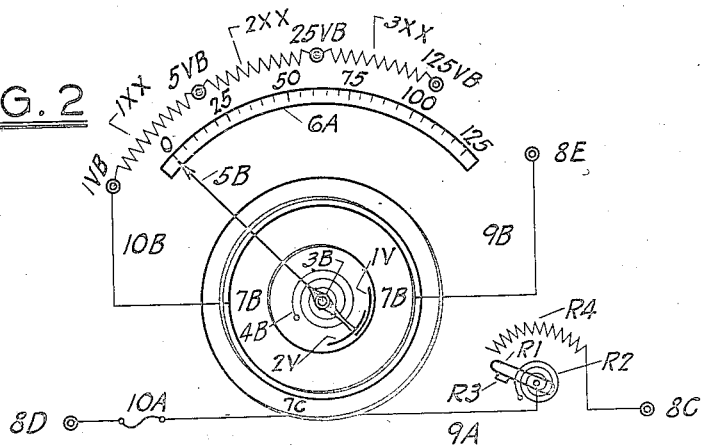

Fig. 1 represents one embodiment of my combined voltmeter and polarity indicator, Fig. 2 is a modification thereof.

A meter of this kind consists of an addition of an extra magnetizing coil wound over or in inductive relation to the voltmeter actuating current so as to coact or react on said meter indications so that an increased strength in the voltmeter field would show an increase on the meter scale. This would mean that the polarities of the two circuits would be the same as the marks on the connecting binding post and a decreased strength of this field would show a decrease on the voltmeter scale and would indicate that the polarity in the second or testing circuit was unlike that of the first circuit. An instrument of this kind would be very useful in railway signaling work, and especially where polyphase apparatus is used, such as polyphase relays in alternating current signaling.

Construction Figure 1 represents an alternating current voltmeter of the type having a laminated electromagnet 1, a movable coil 2, pivoted at 3, a spring 4 to hold the coil in position and a pointer 5, indicating on the scale 6. Upon this electromagnet 1, is wound the potential coil or primary winding 7, actuating the voltmeter connected to the positive terminal post 8, by wire 9. The other end of this coil is connected to the wire 10 through the movable coil 2, wire 11, to terminal post 1v which represents the one volt terminal of the instrument. 1x, 2x and 3x are resistances connecting the 5, 25, and 125 volt scales on the meter, as is done in common practice. The coil 7a is inductively wound over or in same magnetic field as the coil 7. One end of this coil 7a is connected by wire 9a to the rheostat comprising the parts R1, R2, R3 and R4. This rheostat is used to compensate for different voltages of this circuit and has the contact arm R1 held in the off contact position by the spring R2 against the stop R3, the winding of this rheostat R4 is connected to terminal 8a. The other end of this coil is connected through the fuse 10a to the terminal 8b.

Construction Figure 2 represents an alternating current voltmeter of a different type, having a fixed vane 1v, paralleling the magnetic field of the instrument. 2v is a movable vane parallel with the fixed vane 1v. Vane 2v is attached to the pointer 5b, pivoted at 3b, indicating on the scale 6a. The primary coil 7b is the voltmeter magnetizing or primary coil connected by the wire 9b to the binding post 8e. The other end of this primary coil is connected by 10b to the post 1vb, 5vb, 25vb and 125vb, which are connected and used as in Figure 1 by the resistance wires 1xx, 2xx and 3xx. The secondary or polarity test coil 7c is used in inductive relation to the current in the coil 7b of the voltmeter. The external connections of this coil are similar to the coil 7a in Figure 1.

Operation Figure 1 illustrates a source of alternating current connected to the terminal 8 and the terminal 25v is connected to the other source of the same current. This will cause current to flow from post 8, wire 9, through the primary magnetizing coil 7, wire 10, to the movable coil 2, wire 11 to post 1v, 1x, 2x, to the 25v terminal, causing the pointer 5 to move to the 25 volt point on the scale, which is the voltage of this current. We will now assume that we have another or secondary source of current that we wish to determine the polarity of, in relation to the current going through the voltmeter. We will connect this source to be tested or checked to the terminal 8a and the other side of this circuit to the terminal 8b. The rheostat arm R1 is then moved to connect with the R4 resistance until the pointer 5 shows an increase or decrease on the 25 volt point on scale which was the indicated voltage of the primary current. If this reading shows an increase on this scale it will indicate that the polarities of the two circuits are alike and if a decrease is shown on the 25 volt point of scale it will show that the polarities are unlike.

Operation Figure 2 illustrates a source of current connected to the terminal 8e and the terminal 25vb is connected to the other wire of same source. This will cause current to flow through wire 9b, primary or potential magnetizing coil 7b, wire 10b to 1vb, wire 1xx, wire 2xx to the 25 volt terminal. This will magnetize the vanes 1v and 2v. As like magnetic poles repel this will cause the two vanes to repel and move the pointer 5b to the 25 volt division on scale which is the voltage of the first source of current. We will now connect another source to determine the polarity, connecting one wire to terminal 8c and the other wire of this circuit to be checked to the post 8d. Since this is the same as in Figure 1 the result on the pointer will be the same as in Figure 1 and show an increase on the volt meter scale if the polarities are alike and a decrease on the voltmeter if the polarities are different.

It is to be understood that I do not limit this invention to the types of meters shown in the drawing as it may have other uses without departing from the novelty of the invention.

I claim:

1. In combination with an alternating current voltmeter, having a primary winding and a source of current, of a secondary test circuit inductively related to said primary circuit.

2. In combination with an alternating current voltmeter, having a primary or operating circuit as used in measuring alternating current voltages, of a secondary test circuit inductively related to said primary or operating circuit.

3. In combination with an alternating current voltmeter, having a primary winding to operate said voltmeter, of a secondary winding inductively related to said primary winding to determine the relation of said circuit in the secondary winding.

4. In combination with an alternating current measuring instrument having a primary winding and a source of current for said instrument, of a secondary winding inductively connected to said primary winding, and a source of current for said secondary winding and means to determine the relation of said secondary current in relation to the first or primary current.

5. In combination with an alternating current voltmeter a source of current and a potential coil to operate said meter, of a secondary winding inductively related to said potential coil and a source of current for said secondary winding and means whereby said meter will in one direction indicate a like polarity and a movement of said meter in the opposite direction will indicate an unlike polarity of the circuit being tested.

6. In combination with an alternating current measuring instrument, a primary coil, a magnetic field produced by said primary coil and a movable element actuated by said primary coil when connected to a source of current, of a secondary coil inductively related to said primary coil and magnetic field, so as to vary the strength of said magnetic field when the secondary coil is connected to a second source of current thereby indicating by the movable element the relation of the current in said secondary coil to that of the first source of current.

7. In combination with an alternating current voltmeter and a source of current for said meter, of a second source of current to be tested inductively connected to said first source of current in such a manner as to cause an increase or decrease of the flux produced by said first source of current through said voltmeter.

8. In combination with an alternating current measuring instrument and a source of current for said instrument of a second testing current inductively associated with the first said current to increase or decrease the effect produced upon said measuring instrument when the two sources of current are connected to their respective instrument windings.

9. In combination with an alternating current measuring instrument and a source of current for said instrument, of a second source of current inductively related to said first source and means to determine the relation of the second source of current by the inductive effect on first said current as indicated by said measuring instrument.

10. In a combined alternating current volt and polarity meter, the combination with an alternating current voltmeter having a primary winding and a source of current for said winding and adapted when energized to indicate the voltage of said current, of a second or polarity test circuit inductively related to said primary circuit to vary the indicated voltage on said meter when said secondary circuit is connected to the second source of current.

11. In a combined volt and polarity meter, the combination with an alternating current voltmeter of a first and a second source of current, said meter when connected to the first source of current indicating the voltage of the circuit connected to the voltmeter, the second source of current being inductively associated with the first source of current and adapted to coact or react with said first source of current to vary the indicated voltage of said first source of current, thereby indicating the polarity of the second source in relation to that of said first source of current.

12. In a combined alternating current volt and polarity meter, the combination with two sources of current having like or unlike polarities, an alternating current voltmeter adapted to be connected to one of said sources of current to indicate the voltage of said circuit, means inductively associated with said alternating current voltmeter and the other source of current to coact or react on the indicated voltage on said meter and said first source of current to determine the polarity of the other source of current in relation to that of the first source of current.

13. In a combined alternating current volt and polarity meter, the combination with an alternating current voltmeter, a source of current and a voltage coil to operate said meter and indicate the voltage of said source of current, of a secondary winding inductively related to said voltage coil and a source of current for said secondary winding whereby, said meter will in one direction of movement augment the indicated voltage of said first source of current and a movement of said meter movement in an opposite direction will indicate an unlike polarity of the circuit being tested.

14. In an alternating current measuring instrument, a first and a second source of current, means when connected to said first source of current to indicate the intensity of said source and means inductively associated with the second source of current to vary the intensity of the first source of current as indicated by said measuring instrument to determine the condition of said second source in relation to that of the first source.

15. In an alternating current measuring instrument, the combination with an alternating current measuring instrument, a first and a second source of current, a primary coil and a magnetic field produced by said primary coil when connected to the first source of current and a movable element actuated by said primary coil and magnetic field to indicate the intensity of the first source of current, of means inductively associated when connected to the second source of current to change the strength of the magnetic field energized by the first source of current thereby varying the indicated intensity of the first source of current by said movable element in relation to that of the second source of current.

WESLEY H. GEIGER.